United States Patent [19]

Cole et al.

[11] Patent Number: 4,729,493

[45] Date of Patent: Mar. 8, 1988

[54] POWERED SEED SPACER

[76] Inventors: John M. Cole; Ruth E. Cole, both of 2715 So. Elmwood Ave., Sioux Falls, S. Dak. 57105

[21] Appl. No.: 18,441

[22] Filed: Feb. 25, 1987

[51] Int. Cl.⁴ .............................................. A01C 7/02
[52] U.S. Cl. .................... 221/185; 221/186; 221/258; 221/265; 111/82; 111/78
[58] Field of Search ............... 221/185, 186, 258, 265; 222/174; 111/82, 78

[56] References Cited

U.S. PATENT DOCUMENTS

| | | | |
|---|---|---|---|
| 159,148 | 1/1875 | Braud | 111/74 |
| 269,869 | 1/1883 | Mayers | 222/171 |
| 321,321 | 6/1885 | Stanton | 111/74 |
| 353,232 | 11/1886 | Pates | 172/727 |
| 652,797 | 5/1900 | Stoodley | 111/82 |
| 698,927 | 4/1902 | Gale | 172/132 |
| 964,115 | 7/1910 | Moore | 172/729 |
| 965,121 | 7/1910 | Pankey | 172/366 |
| 1,055,347 | 3/1913 | Nukks | 222/169 |
| 1,164,393 | 12/1915 | Randolph | 172/132 |
| 1,209,430 | 12/1916 | Greimann | 172/393 |
| 1,653,228 | 12/1927 | Rapp | 222/171 |
| 1,695,608 | 12/1928 | Resseguie | 172/387 |
| 1,841,236 | 1/1932 | Zaback | 111/85 |
| 2,302,716 | 11/1942 | Riegelsberger et al. | 111/82 |
| 3,031,984 | 5/1962 | Esmay | 111/82 |
| 3,087,444 | 4/1963 | Ferguson et al. | 111/74 |
| 3,097,759 | 7/1963 | Jett | 221/190 |
| 3,162,153 | 12/1964 | Schulz, Jr. | 111/51 |
| 3,187,698 | 6/1965 | Murray | 111/2 |
| 3,220,370 | 11/1965 | Smith | 111/51 |
| 3,225,839 | 12/1965 | Petitt | 172/398 |
| 3,401,846 | 9/1968 | Delaney | 222/282 |
| 3,774,557 | 11/1973 | Esmay et al. | 111/82 |
| 3,943,660 | 3/1976 | Hosaka | 47/1.41 |
| 3,979,071 | 9/1976 | Biggs, Jr. | 239/653 |
| 4,315,580 | 2/1982 | Beckwork | 221/185 |

FOREIGN PATENT DOCUMENTS

122744 2/1919 United Kingdom .
127424 6/1919 United Kingdom .

Primary Examiner—Joseph J. Rolla
Assistant Examiner—Lisa C. Waag
Attorney, Agent, or Firm—Schroeder & Siegfried

[57] ABSTRACT

A powered seed dispenser for uniformly distributing seeds along the ground which includes a handle carrying a powered driven motor and a pivotally mounted seed distributor which is engaged and driven by the powered driven motor, the seed distributor being constructed of a pair of opposed discs, each disc having a pair of inner and outer sidewalls extending transversely therefrom toward its opposing disc, such discs being constructed and arranged to connect together telescopically in such manner as to create an inner metering chamber and an outer dispensing chamber wherein seeds contained inside the metering chamber discharge through openings in the inner sidewalls from the top portion of the volume of seeds, such seeds then falling into the dispensing chamber defined by the outer sidewalls where they are directed and discharged uniformly through dispensing apertures in the outer sidewalls at a point adjacent to the lowermost point of travel of the dispensing apertures.

15 Claims, 5 Drawing Figures

POWERED SEED SPACER

BACKGROUND OF THE PRIOR ART

The present invention relates to a seed distribution means which is used primarily for home gardens.

Many of the prior art devices for distributing seeds have generally involved a turning wheel assembly or drum assembly which contain a quantity of seeds and which discharged these seeds at allegedly fixed intervals along a furrow in the ground. Various problems have occurred through the use of such prior art devices which the present invention effectively avoids. For example, none of the prior art take into account the binding or bridging effect seeds have when they are pushed through a small hole thereby clogging the hole; nor have such devices taken into account the fact that as a perforated wheel or drum rotates the seeds contained therein may undesireably discharge through openings at points other than through those openings adjacent to the ground. Seeds may discharge off the top of the volume of seeds contained within a wheel or drum assembly as the perforations in the wheel assembly turn past the top portion of the seed volume before reaching the lowermost point of travel adjacent to the ground.

As a consequence of seed binding and/or seed discharging through undesired openings in the wheel or drum assembly, the prior art seed distributing devices fail to distribute the seeds evenly along the ground. The seeds may bind in the opening adjacent the ground as the wheel rotates thereby prohibiting the seeds from discharging and causing a interval between seeds to be greater than desired. Moreover, seeds may discharge through the lowermost opening and also discharge through an opening in the wheel or drum assembly as it passes the top portion of the volume of seeds thereby causing seeds to drop at a closer interval than desired.

One further consequence associated with seeds discharging from the top portion of seeds contained within the seed dispensing container through openings in the container adjacent thereto is that the seeds are discharged at an elevated level relative to the ground. If the seeds being discharged from the seed distribution device are extremely small and light weight, then dropping such seeds at an elevated level subjects them to the effects of the wind which can easily cause such seeds to blow away from the area which is to be planted.

The present invention avoids the problems commonly associated with the prior art devices by utilizing the effects of dual rotating chambers, one chamber surrounding the other, wherein the seeds contained within the inner chamber discharge into the outer chamber first, and thereafter through the outer chamber into the ground. By so doing, the seeds contained within the inner chamber may discharge from the top portion of the seed volume without falling to the ground at an undesired location and are not affected by the wind. Instead, the seeds in the inner chamber fall into the outer chamber where such seeds are uniformly distributed at spaced intervals only at the lowermost point of travel of the openings in the outer chamber.

As a consequence, undesired spacing intervals commonly obtained through the use of the prior art devices are substantially eliminated because each seed which is discharged from the inner chamber into the outer chamber of the present invention will not be discharged until the next opening in the outer chamber reaches its lowermost point of travel adjacent the ground. Furthermore, by only allowing the seeds to discharge at the lowermost point adjacent the ground, the present invention minimizes the effect of wind which commonly causes seeds distributed through the use of prior art devices to be blown away from the area to be planted.

It is the primary object of this invention to provide a powered seed dispensing device which avoids distribution of seeds at undesired intervals and further provides uniform distribution of seeds at a point closest to the ground, thereby substantially minimizing the adverse effects that wind may have upon the seeds.

BRIEF SUMMARY OF THE INVENTION

The present invention is an improved apparatus for dispensing seeds along a furrow in the ground. Many sophisticated and expensive devices have been designed for commercialized planting of seeds. However, for reasons stated earlier in the Background of the Prior Art, there is a need for relatively inexpensive and effective means for distributing seeds in a home garden environment. Use of the present invention will effectively eliminate the problems associated with the prior art devices by providing an easily operated seed distributing apparatus which will distribute seeds at a point closely adjacent to the ground and uniformly therealong.

The present invention is basically comprised of a handle which carries a generally vertically disposed annular seed distributing means which is rotatably mounted to the handle about its horizontal axis, and is driven by an electrically powered drive means also carried by the handle. The seed distributing means and powered drive means are carried by the handle at its lowermost end to effecuate seed dispensing at a point closely adjacent to the ground. By so doing, adverse effects due to the wind which are commonly associated with prior art devices are substantially reduced in the present invention.

The seed distributing means of the present invention utilizes a dual chamber approach to effectively meter and dispense a given quantity of seeds along a furrow in the ground. The metering chamber is disposed within the dispensing chamber. The seeds to be dispensed from the seed distributing device are contained within the inner metering chamber initially, and as each chamber rotates, the seeds contained within the inner metering chamber dispense through cueing apertures into a channel between the inner metering chamber and outer dispensing chamber. Once the seeds have entered the channel between the two chambers, the seeds are essentially in the outer dispensing chamber and are engaged thereby. The seeds are thereafter directed through dispensing apertures arranged circumferentially around the outer confines of the dispensing chamber at points closely adjacent to the ground. In fact, the dispensing apertures in the outer dispensing chamber are constructed and arranged such that the seeds will only discharge through the dispensing apertures at their lowermost point of travel adjacent to the ground.

The construction of the inner metering chamber and outer dispensing chamber is accomplished through the cooperative telescopic engagement of a pair of opposed generally vertically disposed annular discs, each disc having an inner and outer annular sidewall which extends transversely away from the disc in a direction toward the opposing disc. Each inner and outer sidewall extending from each disc is comprised of a plurality of arcuately shaped spaced flanges which are annularly arranged about the axis of the disc. The spaced flanges which make up the annular sidewalls create a plurality of openings therein which function to cooperatively define the cueing and dispensing apertures in the metering and dispensing chambers, respectively, when the pair of opposed discs are cooperatively connected in a telescopic relationship as indicated above.

One end of the dispensing chamber carries a ring gear around its perimeter. The electrically power drive means is carried by the handle in such a way that a worm gear driven by the powered drive means engages the ring gear carried by the dispensing chamber and causes the same to rotate. As the seed distributing means rotates the metering and dispensing chamber necessarily rotate, thereby causing the seeds to dispense.

Initially, the seeds are contained within the metering chamber. As the metering chamber rotates, the seeds contained therein will not generally discharge through the cueing aperture that is adjacent the lowermost point of the seed volume because seeds at this point tend to bind or bridge, thereby clogging the opening. Rather, as the metering chamber turns the seeds will primarily discharge from the top of the volume of seeds contained therein through cueing appertures adjacent thereto. By having the metering chamber enclosed within an outer dispensing chamber the seeds which fall from the elevated cueing apertures which are adjacent to the top portion of the volume of seeds contained in the metering chamber are not subjected to the adverse effects of wind which is a common problem associated with the prior art devices.

The seeds discharged from the metering chamber are caught by the sidewalls of the dispensing chamber and are held within the dispensing chamber until the same rotates to a position where a dispensing aperture is at its lowermost point of travel adjacent the ground. Only at this time are seeds contained within the dispensing chamber allowed to discharge into a furrow in the ground. As a consequence, the adverse effects of wind and nonuniform spacing of seeds in the ground due to bridging and/or seeds discharging from the top portion of their volume, before desired, are effectively eliminated.

The electrically powered motor which is used to drive the distributing means of this improved seed distribution apparatus rest normally in an open position. An actuation button is carried by the handle at its uppermost end so that the operator of the seed distribution apparatus may selectively actuate the device when desired.

It is the primary object of the invention to provide uniform dispensing of seeds to a furrow in the ground by utilizing a dual chamber device wherein one chamber is disposed within confines of the other chamber thereby effectively eliminating the adverse effects of seeds bridging or binding over openings they are to discharge through, yet causing seeds from the top portion of the volume of seeds to be distributed to be discharged to the ground at evenly spaced intervals.

It is a further object of this invention to provide an effective seed distribution apparatus which distributes seeds uniformly along the ground at a point mostly adjacent thereto so as to avoid the adverse effects of the wind blowing the seeds away from the area to be planted.

DETAILED DESCRIPTION OF THE INVENTION

Figure 1:
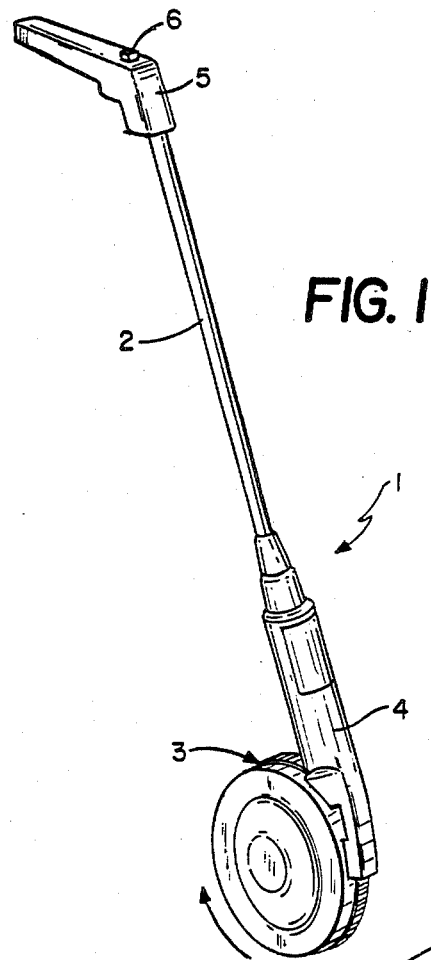
FIG. 1 is a perspective view of my Powered Spacer.

Referring now to FIG. 1, the apparatus shown is an improved seed dispenser 1 which is generally comprised of an elongated handle member 2 carrying a generally vertically disposed annular seed distributing means 3 which is rotatably mounted thereto. The seed distributing means 3 is rotatably driven by the electrically powered drive means 4 which is also carried by the handle 2 at the lower end thereof. The upper end of the handle 2 has a grip portion 5 which extends upwardly and outwardly for easy and convenient operator handling. The grip portion 5 carries a actuation switch 6 which provides the operator with means for selectively actuating the improved seed dispenser 1 whenever desired.

Figure 2:
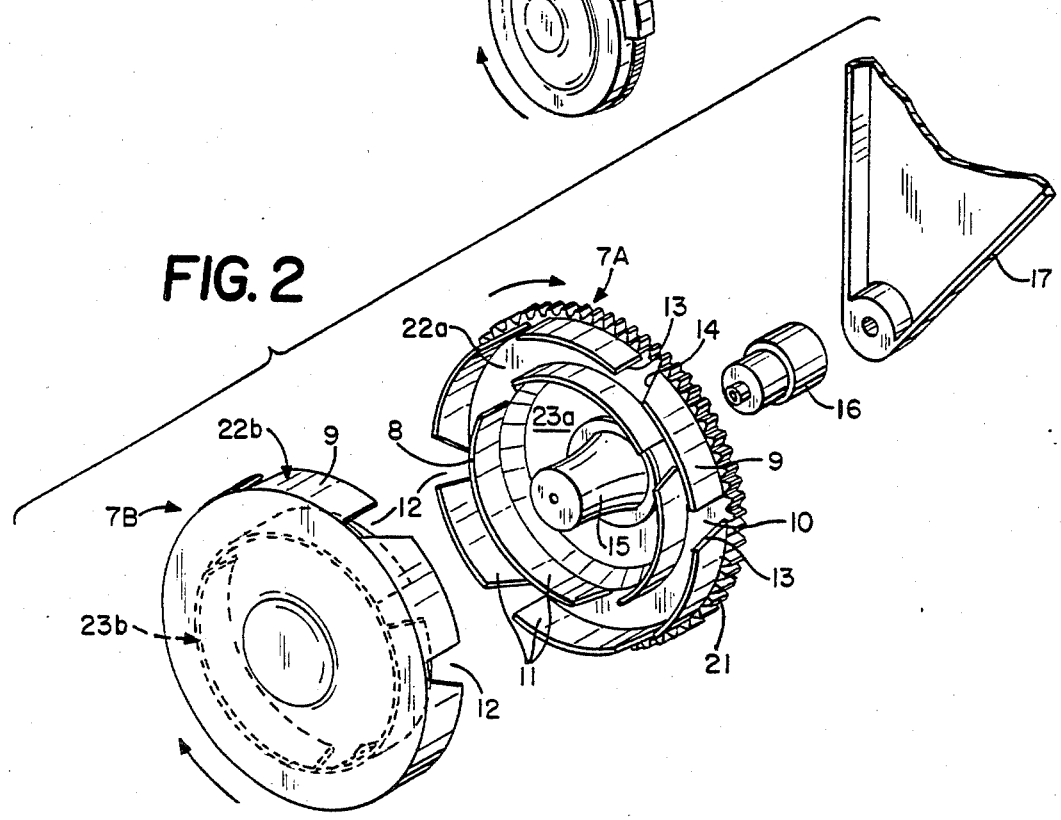
FIG. 2 is an exploded view of the seed distribution means thereof, showing the inner and outer sidewalls thereof.

Referring now to FIG. 2, it will be seen that the seed distributing means 3 is comprised of a pair of opposed annular vertically disposed discs 7a and 7b, each having an inner sidewall 8 and an outer sidewall 9. Both the inner sidewall 8 and the outer sidewall 9 of each opposed disc 7a and 7b extend transversely away from their respective disc in a direction substantially parallel to the generally horizontal axis of the disc toward the opposing disc. For example, the inner sidewall 8 and outer sidewall 9 of disc 7a as shown in FIG. 2 extend transversely away from disc 7a toward disc 7b. Similarly, the inner sidewall 8 and outer sidewall 9 corresponding to disc 7b extend transversely away from disc 7b toward disc 7a.

The inner side-walls 8 and the outer sidewalls 9 are annularly disposed about the generally horizontal axis of each respective disc 7a and 7b, and each inner sidewall 8 has a smaller diameter and is necessarily spaced radially inward from its corresponding outer sidewall 9 on the same disc. Because each inner sidewall 8 is disposed radially inward from its corresponding outer sidewall 9, a channel 10 is defined therebetween.

Each disc 7a and 7b, along with their respective outer sidewall 9 and inner sidewall 8, define first and second dome-shaped members respectively. For example, disc 7a and the outer sidewall 9 associated therewith define a first dome-shaped member 22a. Disc 7a and the inner sidewall 8 associated therewith form a second dome-shaped member 23a. Similarly, disc 7b and the outer and inner sidewalls 9 and 8 associated with disc 7b also form first and second dome-shaped members 22b and 23b respectively.

From FIG. 2 it is apparent that the first dome-shaped member 22a surrounds the second dome-shaped member 23a, and the second dome-shaped member 23a is an integral part of the first dome-shaped member 22a in that both dome-shaped members 22a and 23a share the same disc 7a. Dome-shaped members 22b and 23b are in like relationship to one another as dome-shaped members 22a and 22b are.

Each inner sidewall 8 and outer sidewall 9 are comprised of a plurality of transversely extending arcuately shaped flanges 11 which are annularly arranged at their respective radiuses about the generally horizontal axis of each disc, 7a or 7b. Each flange 11 which defines a portion of a sidewall 8 or 9 is circumferentially spaced from adjacent flanges 11 defining the same sidewall, thereby creating a plurality of openings 12 in each inner sidewall 8 and outer sidewall 9.

For purposes of further discussion, it will be noted at this time that rotation of the seed distributing means 3 in a direction as shown by the arrows in FIG. 1 and FIG. 2 is defined as the forward direction. Thus, as shown in FIG. 2, each flange defining a portion of a sidewall 8 or 9 has a leading edge 13 and trailing edge 14. The leading edge 13 of any such flange 11, regardless of whether reference is made to disc 7a or 7b, extends axially away from its respective disc in a direction substantially parallel to the axis of the disc. The trailing edge 14 of each flange 11 is beveled circumferentially forward and extends axially away from the disc which carries it.

The openings 12 which are created by the spaced annularly arranged flanges 11 also have leading and trailing edges which correspond to the trailing and leading edges 14 and 13 of the flanges 11, respectively. Thus, the leading edges of the openings 12 are defined by the trailing edges 14 of the flanges 11, and the trailing edges of the openings 12 are defined by the leading edges of the flanges 11.

If each disc 7a and 7b, together with their respective inner and outer sidewalls 8 and 9, are viewed as dome-shaped members, then it can readily be seen that each dome-shaped member 22a, 22b, 23a, and 23b has a plurality of openings 12 which can be described as having leading edges which are beveled circumferentially forward and extend radially outward along the periphery of the dome-shaped members towards their respective bases 24. Also, the trailing edges of openings 12 can be viewed as extending radially outward along the periphery of the dome-shaped members towards their respective bases 24.

Disc 7a has a hub 15 disposed at the center of disc 7a and surrounding the axis of the same. The hub 15 is constructed and arranged to receive and rotate about axial pin 16 which in turn connects to the support member 17 which is an integral part of the lower end of handle 2. Disc 7a also carries a ring gear 21 around its outer perimeter at a point adjacent to support member 17 of handle 2, and functions to engage the powered drive means 4 of the seed dispenser 1 and to be rotatably driven thereby.

Figure 4:
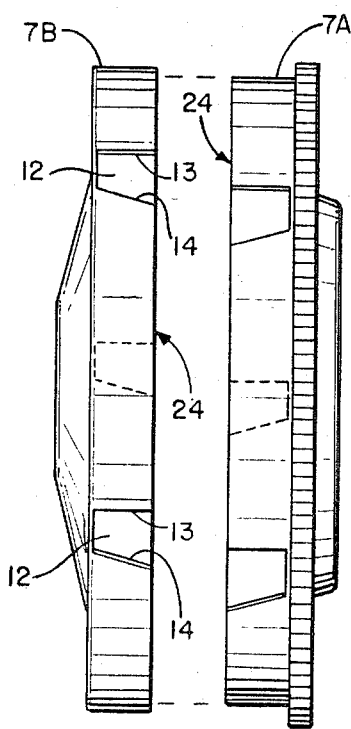
FIG. 4 is a front elevational view of the pair of discs in spaced relation and having inner and outer sidewall with openings therein which engage telescopically to cooperatively create the seed distributing means.
Figure 5:
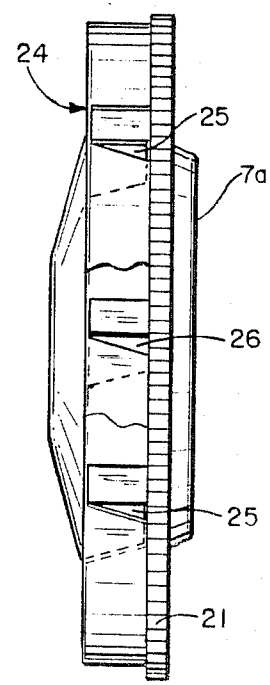
FIG. 5 is a front elevational view of the pair of discs shown in FIG. 4 telescopically connected in assembled form.

The inner sidewalls 8 and the outer sidewalls 9 of disc 7b have an inner diameter that is only slightly greater than the outer diameter of the inner sidewalls 8 and outer sidewalls 9 of disc 7a, respectively. As shown in FIG. 4 and 5, the reason for the slightly greater diameter of the sidewalls on disc 7b over the sidewalls on disc 7a is that disc 7b must cooperatively engage disc 7a in a telescopic relationship. Also, as shown in FIG. 2, the flanges 11 which define the inner sidewalls 8 and outer sidewalls 9 on disc 7b have slightly beveled outer ends 18 to facilitate cooperative alignment of the sidewalls of disc 7a with the sidewalls of disc 7b when disc 7b is press fitted onto disc 7a telescopically.

Figure 3:
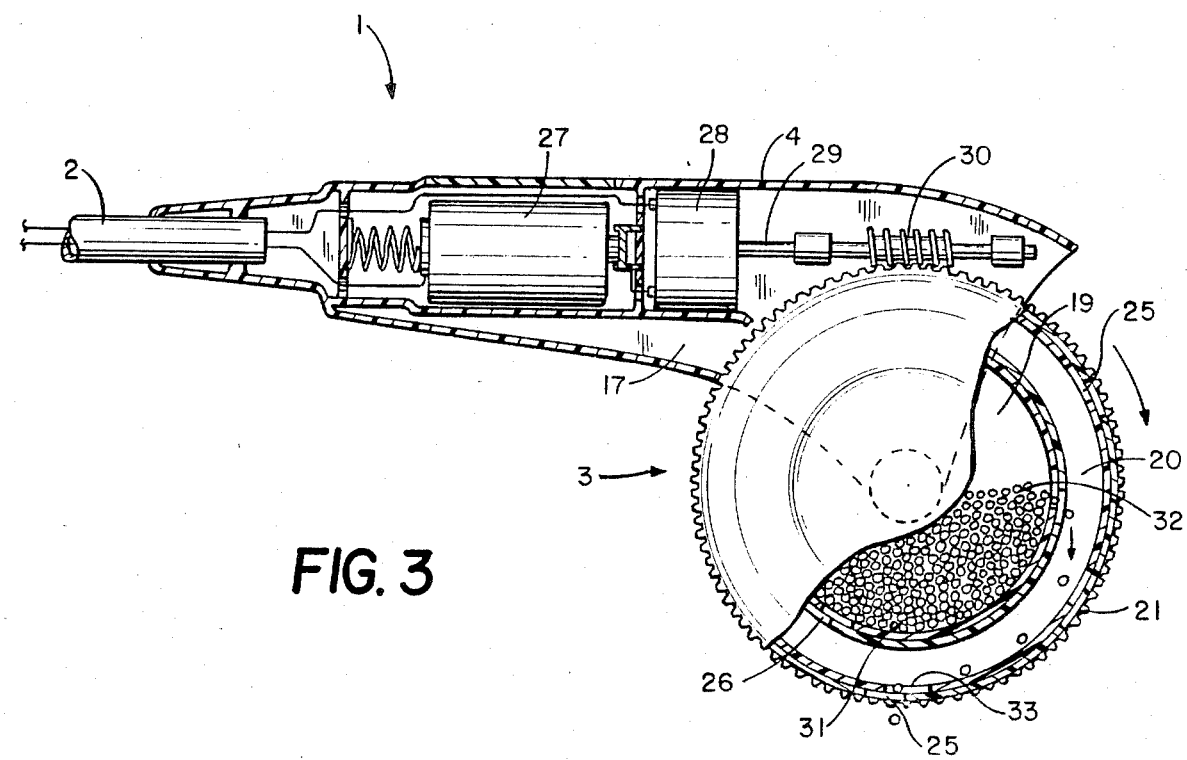
FIG. 3 is a side elevational view of the lower end of my Powered Seed Spacer, with the powered drive means shown in vertical section and the seed distribution means having a portion thereof broken away to show how the seeds are discharged.

Once disc 7b telescopically engages disc 7a, as shown in FIG. 5, the resulting structure is essentially a pair of generally cylindrically shaped chambers - an inner metering chamber 19 and an outer dispensing chamber 20. As best shown in FIG. 3, the cooperative alignment of the inner sidewalls 8 of discs 7a and 7b form the body of the generally cylindrically shaped inner metering chamber 19. Similarly, the cooperative alignment of the outer sidewalls 9 of discs 7a and 7b effectively form the body of the outer dispensing chamber 20. Disc 7a and disc 7b form the opposite ends of each generally cylindrical chamber 19 and 20.

As best seen in FIG. 5, when the outer sidewalls 9 of each respective disc 7a and 7b engage telescopically, the openings 12 in the outer sidewalls 9 of each respective disc 7a and 7b may be positioned to overlap, thereby cooperatively forming dispensing apertures 25 in the body of the outer dispensing chamber 20. Such engagement of disc 7a and 7b so as to create dispensing apertures 25 will automatically cause the openings 12 in the inner sidewalls 8 of each respective disc 7a and 7b to cooperate and form a plurality of cueing apertures 26 in the body of the inner metering chamber 19. It should be noted that disc member 7b and its corresponding inner sidewalls 8 and outer sidewalls 9 can be rotated and selectively positioned to enlarge or to make smaller the dispensing and cueing apertures, 25 and 26 and that such apertures will be equal in size.

It will be noted that in the preferred embodiment of this invention, as shown in FIG. 2, the outer sidewalls 9 of disc 7a and 7b each have six equally spaced openings 12, and the inner sidewalls 8 of each respective disc 7a and 7b have three equally spaced openings 12 associated therewith. When disc 7a and 7b are telescopically engaged, the inner and outer sidewalls 8 and 9 of each disc cooperate to form six dispensing apertures 25 and three cueing apertures 26.

FIG. 3 shows how the electrically powered drive means 4 functions to rotatably drive the seed distributing means 3. The powered drive means 4 receives its electrical energy from a conventional D size battery 27. The electrical energy from battery 27 powers motor 28 which in turn rotates shaft 29. Shaft 29 carries a worm gear 30 and the rotation of shaft 29 causes the worm gear 30 to also turn. Because the worm gear 30 is constructed and arranged to engage the ring gear 21 carried by disc 7a in a conventional manner, the rotation of worm gear 30 simultaneously causes the rotation of the seed distributing means 3.

In operation, the seed volume to be distributed is initially contained within the metering chamber 19 as shown in FIG. 3. When the operator so desires, the improved seed dispenser 1 may be actuated by simply depressing the actuation switch 6. By pressing the actuation switch 6, continuity is made between the battery 27 and the motor 28. The motor 28 will turn shaft 29 so that worm gear 30 will also rotate. Worm gear 30 engages ring gear 21 carried by disc 7a and the rotation of worm gear 30 drives the entire seed distributing means 3 in its forward direction.

As the seed distributing means 3 rotates, the seeds contained within the metering chamber 19 will not generally discharge through cueing apertures 26 which are adjacent the lowermost portion 31 of the seed volume because seeds at this point tend to bind or bridge, thereby clogging the opening. However, the seeds at the top portion 32 of the seed volume will not bind and clog the cueing apertures 26 adjacent thereto because the seeds on the top portion 32 of the seed volume are freely movable and have no binding forces exerted on them. Thus, seeds contained within the metering chamber 19 of the seed distributing means 3 primarily discharge through cueing apertures 26 which are adjacent to the top portion 32 of the seed volume contained therein.

As the seeds discharge from the metering chamber 19, the seeds are received by the outer dispensing chamber 20. As the seeds fall out the cueing apertures 26 in the metering chamber 19 into the dispensing chamber 20, the seeds descend vertically and are engaged by the outer sidewalls 9 which make up the body of the dispensing chamber 20. The seeds are directed by the outer sidewalls 9 of the dispensing chamber 20 to the lowermost point of rotation 33 of the seed distributing means 3.

The forces of gravity keep the few seeds contained within the outer dispensing chamber 20 at the lowest point of rotation of the dispensing chamber 20. As the dispensing chamber 20 continues to rotate, the dispensing apertures 25 will uniformly reach the seeds as they pass the lowermost point of rotation of the dispensing chamber 20. Because only a few seeds are contained within the dispensing chamber 20 at any given time, as the dispensing apertures 25 pass the lowermost point of travel of the dispensing chamber 20, the few seeds contained therein will discharge without the effects of binding or bridging.

The advantages of using a dual chamber distributing means 3 is readily apparent from FIG. 3. Because the metering chamber 19 is contained within the dispensing chamber 20, the seeds which discharge through cueing apertures 26 at a point adjacent to the top portion 32 of the volume of seeds contained therein are not subjected to the adverse effects of wind, which is a common problem in the prior art devices which utilize only one chamber. In the present invention the seeds which discharge through cueing apertures 26 at a point adjacent to the top portion 32 of a volume of seeds contained therein are simply received by the dispensing chamber 20 and are directed by the same to a point most closely adjacent to the ground (at point 33) where the effects of the wind are minimal.

Furthermore, in prior art devices the effects of seeds binding or seeds discharging through more than one aperture often cause uneven spacing of the seeds. In the present invention, if the seeds discharge from more than one cueing aperture 26, the seeds will simply fall into the dispensing chamber 20 and will thereafter be discharged through dispensing apertures 25 at uniformly spaced intervals. Because only a small number of seeds are contained within the dispensing chamber 20 at any given time, the point at which the seeds are discharged to the ground can be more effectively controlled, thereby providing more uniformly spaced intervals between seeds.

A distinct advantage of the present invention is the degree of control afforded to the user. Since our Seed Spacer is powered, instead of being driven through engagement of the ground, the user is in complete control with respect to spacing and wind effects. Ground driven seed spacing is a function of the spacing of seed openings, in contrast to our invention in which the operator can easily vary the speed at which he walks and thereby adjust the spacing of the seeds desired. In addition, of course, the operator can adjust to compensate for the speed of the wind which prevails by altering the elevation at which he carries the dispensing mechanism relative the furrow or groove into which the seeds are to be deposited. This maximum degree of control is ideal and important because it enables the operator to readily compensate for the wide variations which exist in seed size and the recommended spacings for planting.

In considering this invention, it should be remembered that the present disclosure is illustrative only, and that the scope of the invention should be determined by the appended claims.

We claim:

1. A seed dispenser for discharging a volume of seeds primarily from the top of the volume thereby avoiding seed binding and causing uniform discharge thereof, comprising:
   (a) an elongated handle member having upper and lower ends;
   (b) a seed distributing means pivotally connected to said lower end of said handle for rotation about a generally transverse horizontal axis relative to said handle, said distributing means being comprised of a pair of opposed annular vertically disposed discs each having inner and outer sidewalls annularly arranged about the axis of said disc and extending transversely toward said opposing disc, said inner and outer sidewalls of each of said disc being constructed and arranged to engage said inner and outer sidewalls of said opposing discs, respectively, in telescoping relation;
   (c) said inner and outer sidewalls of each said opposing disc defines a channel therebetween, said inner and outer sidewalls being comprised of a plurality of spaced annularly arranged arcuate flanges having leading and trailing edges and being constructed and arranged to cooperatively create adjustable openings in said inner and outer sidewalls between said flanges for seed discharge when the inner and outer sidewalls of one of said opposing discs engages said other opposing disc in telescopic relation, said seed distributing means being constructed and arranged to hold such a volume or seeds within the confines or said inner sidewalls or said discs when said discs are telescopically engaged, said cooperatively adjustable relationship between said inner and outer sidewalls constituting a means for discharging such a volume of seeds from primarily the top portion of the seeds contained within the confines of said inner sidewalls of said discs through said openings in said inner sidewalls which are adjacent to the top level of the seeds contained therein into said channel between said inner and outer sidewalls as said discs rotate, and thereafter cause the seeds thereby dispensed from the confines of said inner sidewalls to be engaged by said outer sidewalls and directed through said openings in said outer sidewalls uniformly at a point adjacent to the lowermost point of travel of said openings in said outer sidewalls; and
   (d) powered drive means carried by said handle and constructed and arranged to engage and drive said distributing means in a rotational direction about its point of pivotal attachment to said lower end of said handle.

2. The structure defined in claim 1, wherein said inner sidewalls are spaced radially inward from said outer sidewalls on each said disc.

3. The structure defined in claim 1, wherein one of said discs carries a ring gear and is pivotally connected to said handle and is constructed and arranged to carry said other opposed disc whereby said inner and outer sidewalls of each said disc engage in telescoping relation, said disc carrying said ring gear being engaged and rotatably driven by said powered drive means.

4. The structure defined in claim 1, wherein
(e) said leading edges of said flanges on one of said discs extend axially away from said disc in a direction substantially parallel to the axis of said disc are beveled circumferentially forward and extend axially away from said disc and the trailing edge of the same said flanges; and
(f) said leading edges of said flanges creating said openings on said other opposed disc extend axially away from said disc in a direction substantially parallel to said axis of said disc and said trialing edges of the same said flanges extend circumferentially forward and axially away from said disc.

5. The structure defined in claim 1, wherein said drive means is electrically powered.

6. The structure defined in claim 3, wherein said ring gear is disposed circumferentially around the perimeter of said vertically disposed annular disc and is constructed and arranged to be engaged by said powered drive means in a rotatably driven relation.

7. A seed dispenser which produces a uniform discharge of seeds from a seed volume contained in the dispenser by avoiding seed binding at the point of discharge, comprising:
(a) an elongated handle member having upper and lower ends;
(b) a seed distributing means pivotally attached to said lower end of said handle and rotating about a generally transverse horizontal axis relative to said handle, said distributing means comprising:
(i) a metering chamber having a plurality of spaced adjustable cueing apertures and being constructed and arranged to rotate and contain such a volume of seeds said adjustable relationship or said cueing apertures constituting a means for discharging such a volume of seeds through said cueing apertures from the top portion of the seed volume as the metering chamber rotates;
(ii) a dispensing chamber surrounding said metering chamber and having a plurality of spaced adjustable dispensing apertures, said dispensing chamber being constructed and arranged to rotate and to engage and direct seeds discharged from said metering chamber uniformly through said dispensing apertures at points adjacent to the lowermost point of travel of said dispensing apertures as the dispensing chamber rotates; and
(c) powered drive means carried by said handle and constructed and arranged to engage said seed distributing means and rotate said distributing means about its point of pivotal attachment to said lower end of said handle.

8. The structure defined in claim 7, wherein,
(d) said dispensing chamber is comprised of a first pair of generally dome-shaped vertically disposed members having annular bases and opposed concavities, each of said first dome-shaped members having a plurality of equally spaced openings arranged and disposed around the periphery of its base and adjacent thereto, said first dome-shaped members being constructed and arranged to connect together in a telescoping relation whereby said openings in said first dome-shaped members cooperatively form said adjustable dispensing apertures in said dispensing chambers; and
(e) said metering chamber is comprised of a second pair of generally dome-shaped vertically disposed members having annular bases and opposed concavities, each of said second dome-shaped members having a plurality of equally spaced openings arranged and disposed around the periphery of its base and adjacent thereto, said second dome-shaped members being constructed and arranged to connect together in telescoping relation whereby said openings in said second dome-shaped members cooperatively form said adjustable cueing apertures in said metering chamber.

9. The structure defined in claim 8, wherein said second dome-shaped members defining said metering chamber are each an integral part of one of said first dome-shaped members defining said dispensing chambers, the lower base portion of each said second dome-shaped members defining said metering chamber being comprised of equally spaced arcuately shaped flanges extending outwardly from said concavity of one of said first dome-shaped members defining said dispensing chamber toward its said opposing concavity of the other of said first dome-shaped members defining said dispensing chamber, said flanges forming an annular periphery for each of said second dome-shaped members defining said metering chamber which is within the outer peripheral confines of said first dome-shaped members defining said dispensing chamber.

10. The structure defined in claim 7, wherein said dispensing chamber carries a ring gear, said ring gear being constructed and arranged to be engaged and driven by said powered drive means.

11. The structure defined in claim 10, wherein said drive means is electrically powered.

12. The structure defined in claim 8 or 9, wherein one of said first dome-shaped members defining said dispensing chamber is pivotally connected to said handle and carries a ring gear circumferentially around the outer confines of its said annular base, said first dome-shaped member carrying said ring gear being disposed in an engaged and rotatably driven relation with said powered drive means and constructed and arranged to carry said other first dome-shaped member defining said dispensing chamber in a telescopic relation.

13. The structure define in claim 7, wherein said metering chamber is an integral part of said dispensing chamber.

14. The structure defined in claim 7, wherein said metering chamber and said dispensing chamber are generally cylindrically shaped structures having a body with two ends, said chambers being arranged coaxially, the axis of each said chamber being generally horizontal and said metering chamber being disposed within the structural confines of said dispensing chamber, and said adjustable cueing and dispensing apertures being circumferentially disposed and equally spaced about the annular perimeter of said bodies of said cylindrically shaped metering and dispensing chambers, respectively.

15. The structure defined in claim 8, wherein said openings in said first and second dome-shaped members, said first and second dome-shaped members being vertically disposed with opposing concavities, have leading and trailing edges, wherein;

(f) said leading edges of said openings in one of said first dome-shaped members defining said dispensing chamber and said leading edges of said openings in one of said second dome-shaped members defining said metering chamber are beveled circumferentially forward and extend peripherally outward toward their respective said bases of such said first and second dome-shaped members, and said trailing edges of the same said openings extend radially outward along the periphery of such said first and second dome-shaped members from their respective said bases thereof; and (g) said leading edges of said openings of said other opposing first dome-shaped member defining said dispensing chamber and said other opposing second dome-shaped member defining said metering chamber are beveled circumferentially forward and extend peripherally outward toward said bases of said first and second opposing dome-shaped members which define said dispensing and metering chambers respectively, and said trailing edges of the same said openings extend peripherally and radially outward toward said bases of the same said first and second opposing dome-shaped members.

* * * * *

UNITED STATES PATENT AND TRADEMARK OFFICE
CERTIFICATE OF CORRECTION

PATENT NO. : 4,729,493

DATED : March 8, 1988

INVENTOR(S) : Ruth E. Cole and John M. Cole

It is certified that error appears in the above-identified patent and that said Letters Patent is hereby corrected as shown below:

Column 8, line 46, "or" should be changed to --of--.

Column 8, line 47, "or" should be changed to --of--.

Column 9, line 44, a comma should be inserted between the words "seeds" and "said".

Column 9, 44, "or" should be changed to --of--.

Column 10, line 52, "define" should be changed to --defined--.

Signed and Sealed this

Nineteenth Day of July, 1988

Attest:

DONALD J. QUIGG

Attesting Officer

Commissioner of Patents and Trademarks